United States Patent
Moon et al.

(10) Patent No.: US 10,069,178 B2
(45) Date of Patent: Sep. 4, 2018

(54) BATTERY CELL HAVING CONNECTING PROTRUSION FOR VOLTAGE SENSING AND BATTERY MODULE COMPRISING THE SAME

(71) Applicant: LG CHEM, LTD., Seoul (KR)

(72) Inventors: Jung Oh Moon, Daejeon (KR); Dal Mo Kang, Daejeon (KR); Jong Woon Choi, Daejeon (KR); Jun Yeob Seong, Daejeon (KR); Byung O Kong, Daejeon (KR); Youngsop Eom, Daejeon (KR)

(73) Assignee: LG CHEM, LTD., Seoul (KR)

( * ) Notice: Subject to any disclaimer, the term of this patent is extended or adjusted under 35 U.S.C. 154(b) by 103 days.

(21) Appl. No.: 14/911,946

(22) PCT Filed: Aug. 18, 2014

(86) PCT No.: PCT/KR2014/007606
§ 371 (c)(1),
(2) Date: Feb. 12, 2016

(87) PCT Pub. No.: WO2015/030403
PCT Pub. Date: Mar. 5, 2015

(65) Prior Publication Data
US 2016/0190659 A1    Jun. 30, 2016

(30) Foreign Application Priority Data

Aug. 29, 2013 (KR) .......................... 10-2013-0102783

(51) Int. Cl.
H01M 10/48 (2006.01)
H01M 2/30 (2006.01)
(Continued)

(52) U.S. Cl.
CPC ......... *H01M 10/48* (2013.01); *H01M 2/0237* (2013.01); *H01M 2/1077* (2013.01);
(Continued)

(58) Field of Classification Search
CPC ............................. H01M 10/40; H01M 10/60
(Continued)

(56) References Cited

U.S. PATENT DOCUMENTS 5,445,856 A * 8/1995 Chaloner-Gill ......... B32B 27/18
428/124
2007/0207377 A1* 9/2007 Han ...................... H01M 2/021
429/162
(Continued)

FOREIGN PATENT DOCUMENTS

CN    102782901 A    11/2012
JP    2006-32224 A    2/2006
(Continued)

OTHER PUBLICATIONS

Okada et al. JP 2008-181765. Aug. 7, 2008. English Translation.*
International Search Report issued in PCT/KR2014/007606, dated Jan. 5, 2015.

*Primary Examiner* — James Lee
(74) *Attorney, Agent, or Firm* — Birch, Stewart, Kolasch & Birch, LLP

(57) ABSTRACT

Disclosed herein is a battery cell including a battery cell body having an electrode assembly mounted in a cell case, an electrode terminal protruding from at least one end of the battery cell body, and a connection protrusion for voltage sensing formed integrally with the electrode terminal.

9 Claims, 3 Drawing Sheets

(51) Int. Cl.
  *H01M 2/10*  (2006.01)
  *H01M 2/02*  (2006.01)
  *H01M 10/625*  (2014.01)
  *H01M 10/6551*  (2014.01)
  *H01M 10/42*  (2006.01)
  *H01M 10/6555*  (2014.01)

(52) U.S. Cl.
  CPC ......... *H01M 2/305* (2013.01); *H01M 10/482*
      (2013.01); *H01M 10/425* (2013.01); *H01M*
      *10/625* (2015.04); *H01M 10/6551* (2015.04);
          *H01M 10/6555* (2015.04); *H01M 2220/20*
                                        (2013.01)

(58) Field of Classification Search
  USPC .................................................. 429/121–347
  See application file for complete search history.

(56) References Cited

U.S. PATENT DOCUMENTS

| | | | | |
|---|---|---|---|---|
| 2009/0323293 | A1* | 12/2009 | Koetting | ............ H01M 10/425 361/736 |
| 2010/0247979 | A1* | 9/2010 | Ha | ..................... H01M 2/1077 429/7 |
| 2011/0059342 | A1* | 3/2011 | Lee | ..................... H01M 2/1077 429/93 |
| 2011/0070474 | A1* | 3/2011 | Lee | ....................... B60L 3/0046 429/120 |
| 2012/0171532 | A1 | 7/2012 | Lee et al. | |
| 2013/0040175 | A1 | 2/2013 | Yang et al. | |
| 2013/0171478 | A1* | 7/2013 | Ushijima | ............... H01G 11/76 429/7 |
| 2014/0227577 | A1 | 8/2014 | Lee et al. | |

FOREIGN PATENT DOCUMENTS

| | | |
|---|---|---|
| JP | 2008-181765 A | 8/2008 |
| JP | 2009-187972 A | 9/2011 |
| KR | 10-2007-0114409 A | 12/2007 |
| KR | 10-2009-0118197 A | 11/2009 |
| KR | 10-0937897 B1 | 1/2010 |
| KR | 10-2011-0080537 A | 7/2011 |
| KR | 10-2011-0100910 A | 9/2011 |
| KR | 10-2011-0126765 A | 11/2011 |
| KR | 10-2012-0074421 A | 7/2012 |

* cited by examiner

[FIG. 1]
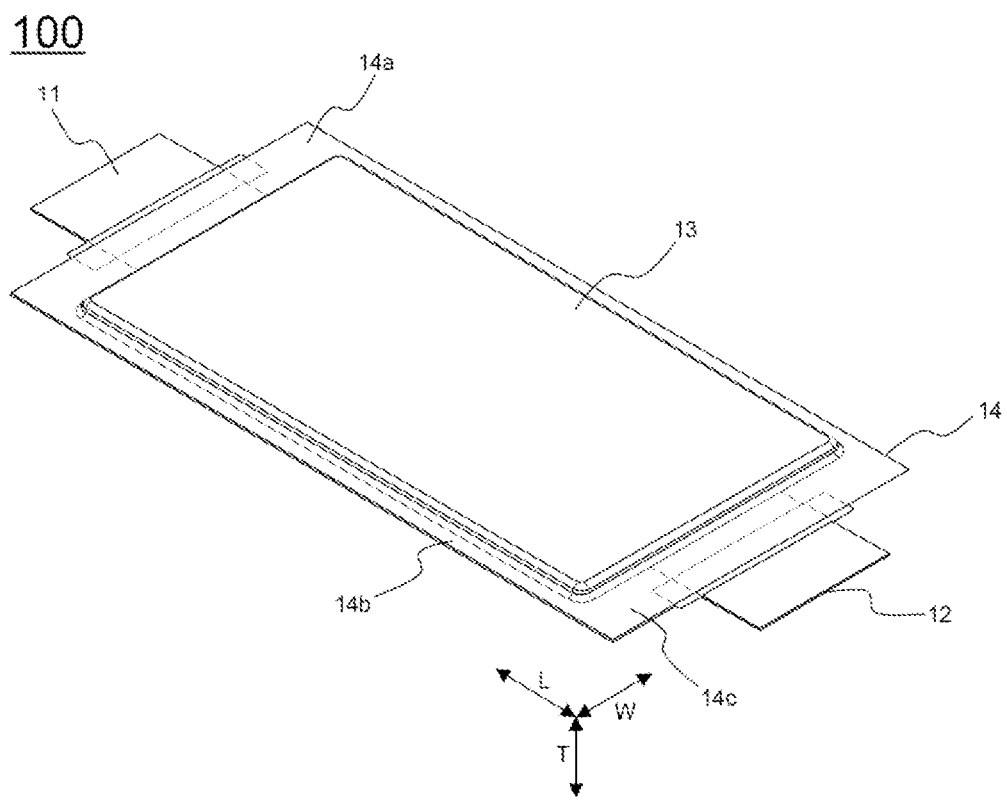
[FIG. 2]
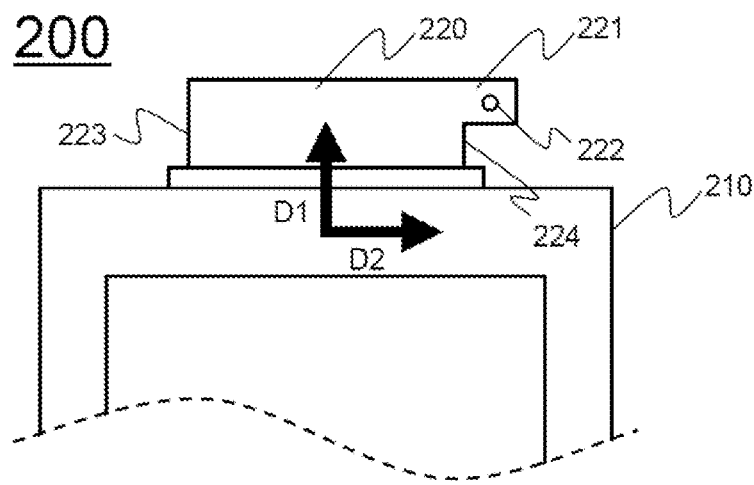

[FIG. 3]
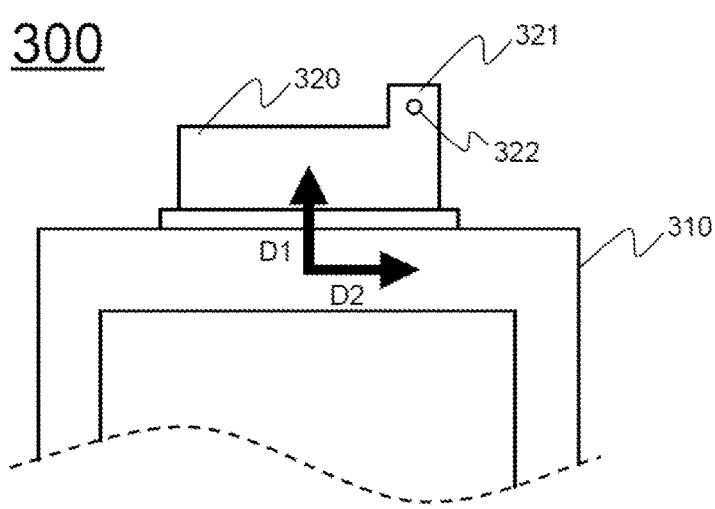
[FIG. 4]
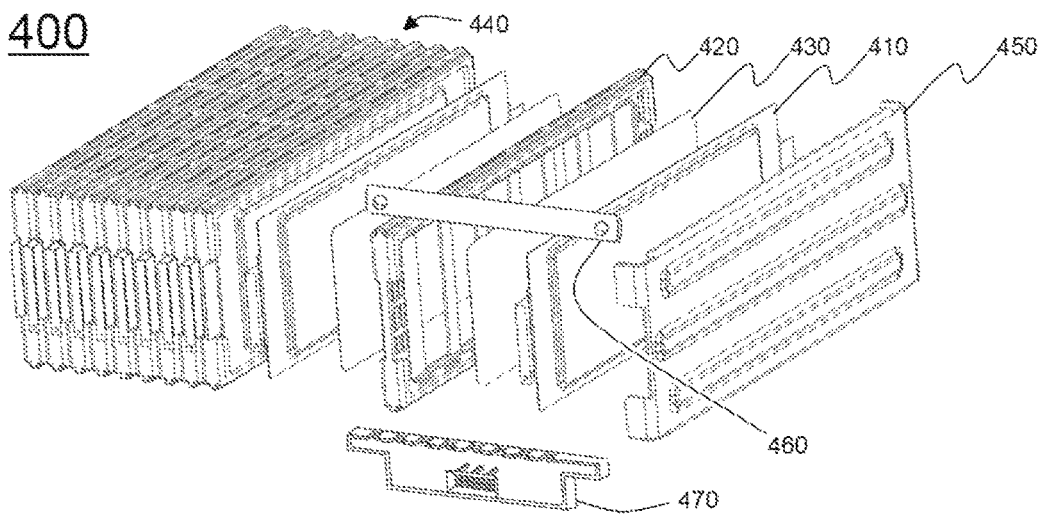

[FIG. 5]
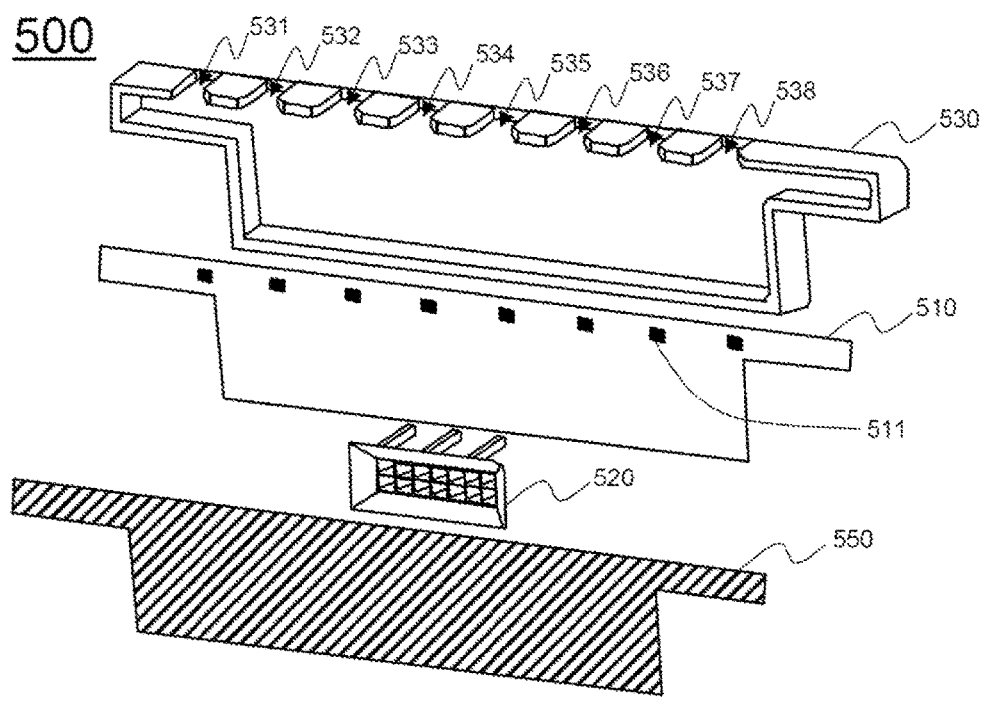
[FIG. 6]
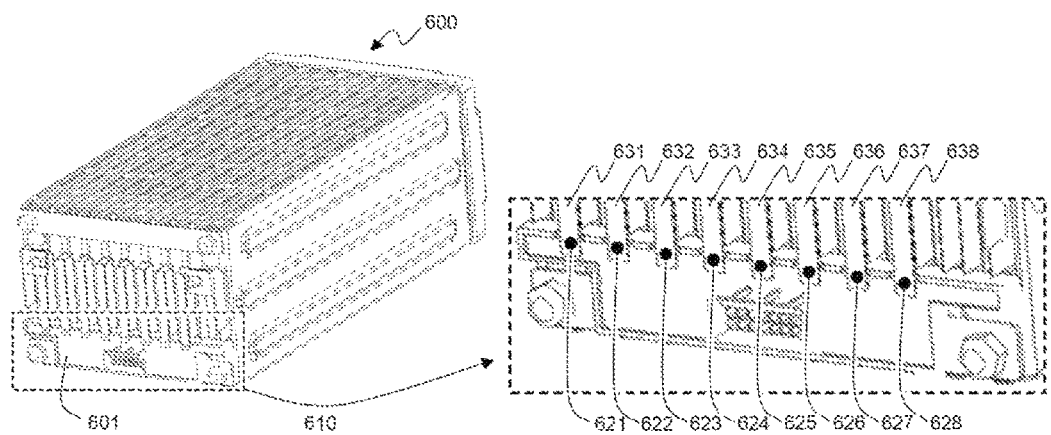

BATTERY CELL HAVING CONNECTING PROTRUSION FOR VOLTAGE SENSING AND BATTERY MODULE COMPRISING THE SAME

TECHNICAL FIELD

The present invention relates to a battery cell including a battery cell body having an electrode assembly mounted in a cell case, an electrode terminal protruding from at least one end of the battery cell body, and a connection protrusion for voltage sensing formed integrally with the electrode terminal, and a battery module including the same.

BACKGROUND ART

Recently, a secondary battery, which can be charged and discharged, has been widely used as an energy source for wireless mobile devices. In addition, the secondary battery has attracted considerable attention as a power source for electric vehicles (EV) and hybrid electric vehicles (HEV), which have been developed to solve problems, such as air pollution, caused by existing gasoline and diesel vehicles using fossil fuels.

As a result, kinds of applications using the secondary battery are being increased owing to advantages of the secondary battery, and hereafter the secondary battery is expected to be applied to more applications and products than now.

Small-sized mobile devices use one or several battery cells for each device. On the other hand, middle or large-sized devices, such as vehicles, use a middle or large-sized battery module having a plurality of battery cells electrically connected to each other because high output and large capacity are necessary for the middle or large-sized devices.

The size and weight of a battery module is directly related to an accommodation space and output of a corresponding middle or large-sized device. For this reason, manufacturers are trying to manufacture small-sized, lightweight battery modules. Furthermore, for devices, such as electric bicycles and electric vehicles, which are subject to a large number of external impacts and vibrations, require stable electrical connection and physical coupling between components constituting the battery module. In addition, a plurality of battery cells is used to accomplish high output and large capacity, and therefore the safety of the battery module is regarded as important.

Preferably, the battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently focused on such a pouch-shaped battery, which uses an aluminum laminate sheet as a sheathing member, because the pouch-shaped battery is lightweight, and the manufacturing cost of the pouch-shaped battery is low.

FIG. 1 is a perspective view typically showing a conventional representative pouch-shaped battery cell. Referring to FIG. 1, a pouch-shaped battery cell 10 is configured to have a structure in which two electrode terminals 11 and 12 protrude from the upper end and the lower end of a battery cell body 13, respectively, such that the electrode terminals 11 and 12 are opposite to each other. In a state in which an electrode assembly (not shown) is mounted in a battery case 14, opposite sides 14a and upper and lower ends 14b and 14c of the battery case 14 are bonded, whereby the pouch-shaped battery cell 10 is manufactured.

In order to connect pouch-shaped battery cells in series and/or in parallel to each other, the electrode terminals of the pouch-shaped battery cells are connected to each other via connection members, such as bus bars, for achieving electrical connection between the pouch-shaped battery cells. In this case, additional electrical connection members are needed. Furthermore, the total size of each of the battery cells is increased, and the structure of each of the battery cells is complicated, since the members are mounted to the battery cells.

Therefore, there is a high necessity for a battery cell that can be electrically connected to another battery cell without additional electrical connection members and a battery module including the same.

DISCLOSURE

Technical Problem

Therefore, the present invention has been made to solve the above problems and other technical problems that have yet to be resolved.

As a result of a variety of extensive and intensive studies and experiments to solve the problems as described above, the inventors of the present application have found that, in a case in which a connection protrusion for voltage sensing is formed at an electrode terminal of a battery cell, and a battery module including battery cells is configured such that connection protrusions for voltage sensing are directly connected to a voltage sensing member to achieve electrical connection between the battery cells, it is possible to interconnect the battery cells without additional electrical connection members, such as bus bars.

Specifically, it is an object of the present invention to provide a battery cell having a connection protrusion for voltage sensing and a battery module configured such that connection protrusions for voltage sensing are directly connected to a voltage sensing member in order to interconnect battery cells without additional electrical connection members, whereby it is possible to reduce the size and weight of the battery module and to reduce manufacturing cost of the battery module.

Technical Solution

In accordance with one aspect of the present invention, the above and other objects can be accomplished by the provision of a battery cell including a battery cell body having an electrode assembly mounted in a cell case, an electrode terminal protruding from at least one end of the battery cell body, and a connection protrusion for voltage sensing formed integrally with the electrode terminal.

In the battery cell according to the present invention and a battery module including the same, therefore, connection protrusions for voltage sensing are directly connected to a voltage sensing member, thereby achieving electrical connection between battery cells. Consequently, it is possible to interconnect the battery cells without additional electrical connection members, such as bus bars, whereby it is possible to reduce the size and weight of the battery module and to reduce manufacturing cost of the battery module.

In a concrete example, the battery cell body is not particularly restricted so long as a battery module can be manufactured using the battery cell body. For example, the battery cell body may be configured to have a plate-shaped structure in which the width and the length of the battery cell body are greater than the thickness of the battery cell body.

The length of the battery cell body indicates the distance between one side of the battery cell body from which the electrode terminal protrudes and the opposite side of the battery cell body, and the width of the battery cell body indicates the distance between one side of the battery cell body adjacent to the side of the battery cell body from which the electrode terminal protrudes and the opposite side of the battery cell body. In addition, the thickness of the battery cell body indicates the distance between the top surface and the bottom surface of the battery cell body parallel to a plane including a direction in which the electrode terminal protrudes from the battery cell body.

In another concrete example, the electrode terminal may be a positive electrode terminal or a negative electrode terminal, may protrude from at least one end of the battery cell body, and may be configured to have a plate-shaped structure in which the width and the length of the electrode terminal are greater than the thickness of the electrode terminal.

The length of the electrode terminal indicates the distance between one side of the electrode terminal abutting on the battery cell body and the opposite side of the electrode terminal, and the width of the electrode terminal indicates the distance between one side of the electrode terminal intersecting the battery cell body and the opposite side of the electrode terminal. In addition, the thickness of the electrode terminal indicates the distance between the top surface and the bottom surface of the electrode terminal parallel to a plane including a direction in which the electrode terminal protrudes from the battery cell body.

The battery cell according to the present invention may include a connection protrusion for voltage sensing formed integrally with the electrode terminal. The connection protrusion for voltage sensing may be formed on the electrode terminal such that the connection protrusion for voltage sensing extends from the battery cell body in a direction in which the electrode terminal protrudes or such that the connection protrusion for voltage sensing extends in a direction perpendicular to the direction in which the electrode terminal protrudes in a plane including the direction in which the electrode terminal protrudes. The connection protrusion for voltage sensing may extend from one end of the electrode terminal.

In a concrete example, the connection protrusion for voltage sensing may extend from at least one side of the electrode terminal intersecting the battery cell body.

In this case, the connection protrusion for voltage sensing may extend by a size equivalent to 5 to 50%, preferably 10 to 40%, and more preferably 20 to 30%, the width of the electrode terminal 220

In another concrete example, the connection protrusion for voltage sensing may be formed at at least one side of the electrode terminal in a state of being opposite to the battery cell body.

In other words, the electrode terminal, which is configured to have a plate-shaped structure, may protrude from at least one end of the battery cell body, the connection protrusion for voltage sensing may be formed at one side of the electrode terminal intersecting the battery cell body in a state in which the connection protrusion for voltage sensing is opposite to the battery cell body, i.e. the connection protrusion for voltage sensing is spaced apart from the battery cell body.

The connection protrusion for voltage sensing may be provided with a welding hole. Consequently, the connection protrusion for voltage sensing may be easily coupled to the voltage sensing member by welding performed through the welding hole.

A welding method is not particularly restricted so long as the connection protrusions for voltage sensing can be welded to the voltage sensing member. For example, the connection protrusions for voltage sensing may be welded to the voltage sensing member using any one selected from a group consisting of a resistance welding method, a laser welding method, an arc welding method, and an ultrasonic welding method.

The kind of the battery cell body of the battery cell according to the present invention is not particularly restricted so long as the battery cell body is configured to have a plate-shaped structure in which the width and the length of the battery cell body are greater than the thickness of the battery cell body. For example, the battery cell body may be configured to have a structure in which the electrode assembly is mounted in a laminate sheet including a resin layer and a metal layer in a sealed state.

Since the battery cell according to the present invention is configured to have a pouch-shaped structure in which an aluminum laminate sheet is used as a sheathing member, therefore, it is possible to total weight of the battery cell and to reduce manufacturing cost of the battery cell.

In accordance with another aspect of the present invention, there is provided a battery module including two or more battery cells with the above-stated construction.

The battery module may include a battery cell array, including one or more cartridges, which forms a structure in which the battery cells are stacked in a state in which electrode terminals are aligned in the same direction, a pair of end plates for fixing opposite ends of the battery cell array, one or more supporting bars for interconnecting the end plates, and a voltage sensing member for sensing voltages of the battery cells.

Each of the cartridges may be a cell module cartridge, using which a battery module may be manufactured. Each of the cartridges may be configured to have a rectangular structure corresponding to a corresponding one of the plate-shaped battery cells such that each of the battery cells is mounted at a corresponding one of the cartridges. Each of the cartridges may include a cooling fin that contacts a corresponding one of the battery cells and a cartridge frame for fixing the cooling fin.

In this case, the voltage sensing member may be mounted at one end of the battery cell array such that the voltage sensing member is adjacent to the electrode terminals. Connection protrusions for voltage sensing of the electrode terminals may be directly connected to the voltage sensing member to achieve electrical connection between the battery cells.

The battery cell according to the present invention and the battery module including the same are characterized in that the connection protrusions for voltage sensing of the electrode terminals are directly connected to the voltage sensing member without additional electrical connection members, such as bus bars, thereby achieving electrical connection between the battery cells. To this end, it is necessary for the voltage sensing member to be mounted at a position adjacent to the connection protrusions for voltage sensing. Since each of the connection protrusions for voltage sensing extends from one end of a corresponding one of the electrode terminals, the voltage sensing member may be mounted at one end of the battery cell array such that the voltage sensing member is adjacent to the electrode terminals.

The voltage sensing member may include (a) a printed circuit board (PCB) having connection terminals, which are connected to connection protrusions for voltage sensing of the electrode terminals, mounted thereon, (b) a connector electrically connected to the connection terminals, and (c) a housing, in which the PCB is mounted in a state in which the connector is exposed.

In this case, the PCB may be mounted in the housing such that the PCB is prevented from being damaged due to external impact or other external force. In addition, the PCB may be fixed to the housing using a hot-melt resin such that the PCB is mounted more stably in the housing.

In a concrete example, the battery cells may constitute the battery cell array in a state in which the electrode terminals, including the connection protrusions for voltage sensing, are bent. More specifically, the connection protrusions for voltage sensing may be bent perpendicularly, and may be directly coupled to the connection terminals of the voltage sensing member by welding.

In the battery cell according to the present invention and the battery module including the same, therefore, the connection protrusions for voltage sensing may be directly coupled to the connection terminals, which are mounted on the PCB, by welding in a state in which the electrode terminals, including the connection protrusions for voltage sensing, are bent. Consequently, it is possible to interconnect the battery cells without additional electrical connection members, such as bus bars, whereby it is possible to reduce the size and weight of the battery module and to reduce manufacturing cost of the battery module.

In accordance with a further aspect of the present invention, there is provided a device including the battery module. The device may be an electric vehicle, a hybrid electric vehicle, a plug-in hybrid electric vehicle, or a power storage apparatus.

The structure and manufacturing method of the device are well known in the art to which the present invention pertains, and therefore a detailed description thereof will be omitted.

DESCRIPTION OF DRAWINGS

The above and other objects, features and other advantages of the present invention will be more clearly understood from the following detailed description taken in conjunction with the accompanying drawings, in which:

FIG. 1 is a typical view showing a conventional pouch-shaped battery cell;

FIG. 2 is a typical view showing an electrode terminal of a battery cell according to an embodiment of the present invention;

FIG. 3 is a typical view showing an electrode terminal of a battery cell according to another embodiment of the present invention;

FIG. 4 is a typical view showing a battery module according to an embodiment of the present invention before components of the battery module are coupled to each other;

FIG. 5 is an exploded view showing a voltage sensing member constituting a battery module according to an embodiment of the present invention; and FIG. 6 is a typical view showing a battery module according to another embodiment of the present invention.

BEST MODE

Now, preferred embodiments of the present invention will be described in detail with reference to the accompanying drawings. It should be noted, however, that the scope of the present invention is not limited by the illustrated embodiments.

Referring first to FIG. 1, the terms, such as a length, a width, and a thickness, described in this specification are defined.

For example, in this specification, a length L of a battery cell body 13 indicates the distance between one side of the battery cell body 13 from which one of electrode terminals 11 and 12 protrudes, and the opposite side of the battery cell body 13 from which the other of the electrode terminals 11 and 12 protrudes, and a width W of the battery cell body 13 indicates the distance between one side of the battery cell body 13 adjacent to the sides of the battery cell body 13 from which the electrode terminals 11 and 12 protrude and the opposite side of the battery cell body 13. In addition, a thickness T of the battery cell body 13 indicates the distance between the top surface and the bottom surface of the battery cell body on the basis of a plane including a direction in which the electrode terminals protrude from the battery cell body.

FIG. 2 is a typical view showing an electrode terminal of a battery cell according to an embodiment of the present invention.

Referring to FIG. 2, a battery cell 200 is configured to have a structure including a battery cell body 210, an electrode terminal 220, and a connection protrusion 221 for voltage sensing.

The battery cell body 210 is configured to have a plate-shaped structure in which the width and the length of the battery cell body 210 are greater than the thickness of the battery cell body 210.

The electrode terminal 220 protrudes from one end of the battery cell body 210. In the same manner as the battery cell body 210, the electrode terminal 220 is configured to have a plate-shaped structure in which the width and the length of the electrode terminal 220 are greater than the thickness of the electrode terminal 220.

The connection protrusion 221 for voltage sensing is integrally formed on the electrode terminal 220 in a plane including a direction D1 in which the electrode terminal 220 protrudes such that the connection protrusion 221 for voltage sensing extends in a direction D2 perpendicular to the direction D1 in which the electrode terminal 220 protrudes.

Specifically, the connection protrusion 221 for voltage sensing is configured to have a structure in which the connection protrusion 221 for voltage sensing extends from one end 224 of the electrode terminal 220. More specifically, the connection protrusion 221 for voltage sensing is configured to have a structure in which the connection protrusion 221 for voltage sensing extends from one of the opposite sides 223 and 224, i.e. the side 224, of the electrode terminal 220 intersecting the battery cell body 210.

In this case, the connection protrusion 221 for voltage sensing may be configured to have a structure in which the connection protrusion 221 for voltage sensing extends by a size equivalent to 5 to 50%, preferably 10 to 40%, and more preferably 20 to 30%, the width of the electrode terminal 220.

In addition, the connection protrusion 221 for voltage sensing is formed at one side 224 of the electrode terminal 220 intersecting the battery cell body 210 in a state in which the connection protrusion 221 for voltage sensing is opposite to the battery cell body 210, i.e. the connection protrusion 221 for voltage sensing is spaced apart from the battery cell body 210. The connection protrusion 221 for voltage sensing is provided with a welding hole 222.

The connection protrusion 221 for voltage sensing is bent such that the connection protrusion 221 for voltage sensing is directly coupled to a voltage sensing member constituting a battery module, thereby exhibiting a desired effect.

FIG. 3 is a typical view showing an electrode terminal of a battery cell according to another embodiment of the present invention.

Referring to FIG. 3, an electrode terminal 320 protrudes from one end of a plate-shaped battery cell body 310, and a connection protrusion 321 for voltage sensing is integrally formed on the electrode terminal 320, in the same manner as in FIG. 2.

However, unlike the FIG. 2, the connection protrusion 321 for voltage sensing extends from the battery cell body 310 in a direction D1 in which the electrode terminal 320 protrudes.

In this case, the connection protrusion 321 for voltage sensing is provided with a welding hole 322 in the same manner as the connection protrusion 221 for voltage sensing of FIG. 2. In addition, the connection protrusion 321 for voltage sensing may be configured to have a structure in which the connection protrusion 321 for voltage sensing extends by a size equivalent to 5 to 50%, preferably 10 to 40%, and more preferably 20 to 30%, the length of the electrode terminal 320.

FIG. 4 is a typical view showing a battery module according to an embodiment of the present invention before components of the battery module are coupled to each other.

Referring to FIG. 4, a battery module 400 is configured to have a structure including two or more battery cells 410. The battery cells 410 constitute a battery cell array 440, including one or more cartridges, which forms a structure in which the battery cells are stacked in a state in which electrode terminals are aligned in the same direction.

In this case, the electrode terminals may be bent such that the electrode terminals can be coupled to each other through recesses of a voltage sensing member 470.

In addition, each of the cartridges is configured to have a structure including a cooling fin 430 that contacts a corresponding one of the battery cells 410 and a cartridge frame 420 for fixing the cooling fin 430.

Opposite ends of the battery cell array 440 are fixed by end plates 450, and the end plates 450 are connected to each other via supporting bars 460.

The opposite ends of the battery cell array 440 means the upper end and the lower end of each of the battery cells 410 in a plane on the basis of the electrode terminals.

In addition, the battery module 400 includes a voltage sensing member 470 for sensing voltages of the battery cells 410.

The voltage sensing member 470 is mounted at one end of the battery cell array 440 such that the voltage sensing member 470 is adjacent to the electrode terminals.

FIG. 5 is an exploded view showing a voltage sensing member constituting a battery module according to an embodiment of the present invention.

Referring to FIG. 5, a voltage sensing member 500 includes (a) a printed circuit board (PCB) 510 having connection terminals, which are connected to connection protrusions for voltage sensing of electrode terminals, mounted thereon, (b) a connector 520 electrically connected to the connection terminals, and (c) a housing 530, in which the PCB is mounted in a state in which the connector is exposed.

In other words, the PCB 510 is not provided with additional bus bars for contacting the electrode terminals of the battery cells, and the connection terminals 511, which are mounted on the PCB 510, are directly connected to the connection protrusions for voltage sensing of the electrode terminals.

In addition, in order to achieve the connection, the housing 530, in which the PCB 510 is mounted, is provided at one side thereof with a plurality of recesses 531, 532, 533, 534, 535, 536, 537, and 538, in which the connection protrusions for voltage sensing of the electrode terminals are received such that the connection protrusions for voltage sensing of the electrode terminals directly contact the connection terminals 511 of the PCB 510.

The PCB 510 is mounted in the housing 530 such that the PCB 510 is prevented from being damaged due to external impact or other external force. In addition, the PCB 510 is fixed to the housing 530 using a hot-melt resin 550 such that the PCB 510 is mounted more stably in the housing 530.

FIG. 6 is a typical view showing a battery module according to another embodiment of the present invention.

Referring to FIG. 6, a battery module 600 includes a battery cell array, including one or more cartridges, which forms a structure in which battery cells are stacked in a state in which electrode terminals 631, 632, 633, 634, 635, 636, 637, and 638 are aligned in the same direction, a pair of end plates for fixing opposite ends of the battery cell array, one or more supporting bars for interconnecting the end plates, and a voltage sensing member 601 for sensing voltages of the battery cells.

In this case, the voltage sensing member 601 is mounted at one end of the battery cell array such that the voltage sensing member 601 is adjacent to the electrode terminals 631, 632, 633, 634, 635, 636, 637, and 638, and connection protrusions for voltage sensing of the electrode terminals 631, 632, 633, 634, 635, 636, 637, and 638 are bent such that the connection protrusions for voltage sensing can be directly connected to the voltage sensing member 601, thereby achieving electrical connection between the battery cells.

Specifically, when the connection protrusions for voltage sensing and connection portions 621, 622, 623, 624, 625, 626, 627, and 628 of the voltage sensing member 601 are seen in detail, the battery cells constitute the battery cell array in a state in which the electrode terminals 631, 632, 633, 634, 635, 636, 637, and 638, including the connection protrusions for voltage sensing, are bent. The bent connection protrusions for voltage sensing are directly coupled to connection terminals mounted on the voltage sensing member 601 by welding performed through welding holes.

In this case, a welding method is not particularly restricted so long as the connection protrusions for voltage sensing can be welded to the voltage sensing member. For example, the connection protrusions for voltage sensing may be welded to the voltage sensing member using any one selected from a group consisting of a resistance welding method, a laser welding method, an arc welding method, and an ultrasonic welding method.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, in a battery cell according to the present invention and a battery module including the same, a connection protrusion for voltage sensing is formed at an electrode terminal of the battery cell, and, in the battery module, which includes battery cells, connection protrusions for voltage sensing are directly connected to a voltage sensing member, thereby achieving electrical connection between the battery cells. Consequently, it is possible to interconnect the battery cells without additional electrical connection members, such as bus bars, whereby it is possible to reduce the size and weight of the battery module and to reduce manufacturing cost of the battery module.

The invention claimed is:

1. A battery module comprising:
   a plurality of battery cells, each battery cell comprising:
   a battery cell body having an electrode assembly mounted in a cell case;
   an electrode terminal protruding from at least one end of the battery cell body; and
   a connection protrusion for voltage sensing extending from the electrode terminal, the connection protrusion being integral with the electrode terminal;
   a battery cell array, comprising one or more cartridges, the battery cell array forming a structure in which the battery cells are stacked such that the electrode terminals are aligned in the same direction;
   a pair of end plates for fixing opposite ends of the battery cell array; and
   a voltage sensing member for sensing voltages of the battery cells extending along one end of the battery cell array, the voltage sensing member corresponding to at least three electrode terminals of the electrode terminals, the voltage sensing member including a printed circuit board,
   wherein the connection protrusions for voltage sensing are directly connected to the printed circuit board to achieve electrical connection between the battery cells.

2. The battery module according to claim 1, wherein each of the cartridges comprises a cooling fin that contacts a corresponding one of the battery cells and a cartridge frame for fixing the cooling fin.

3. The battery module according to claim 1, wherein the printed circuit board (PCB) has connection terminals, the connection terminals being connected to the connection protrusions for voltage sensing of the electrode terminals, mounted thereon;
   a connector electrically connected to the connection terminals; and
   a housing, in which the PCB is mounted in a state in which the connector is exposed.

4. The battery module according to claim 3, wherein the PCB is fixed to the housing using a hot-melt resin.

5. The battery module according to claim 1, wherein the connection protrusions for voltage sensing are bent.

6. The battery module according to claim 1, wherein the connection protrusions for voltage sensing are directly coupled to connection terminals of the voltage sensing member by welding.

7. The battery module according to claim 1, wherein the voltage sensing member comprises:
   a housing; and
   a plurality of protrusions extending inwardly from an edge of the housing of the voltage sensing member to form a plurality of recesses,
   wherein the printed circuit board is in the housing, and
   wherein the connection protrusions extend downwardly between the tabs.

8. A device comprising a battery module according to claim 1.

9. The device according to claim 8, wherein the device is an electric vehicle, a hybrid electric vehicle, a plug-in hybrid electric vehicle, or a power storage apparatus.

* * * * *